Jan. 12, 1926.
A. D. FERGUSON
1,569,362
CONTROL SYSTEM
Filed Nov. 12, 1923
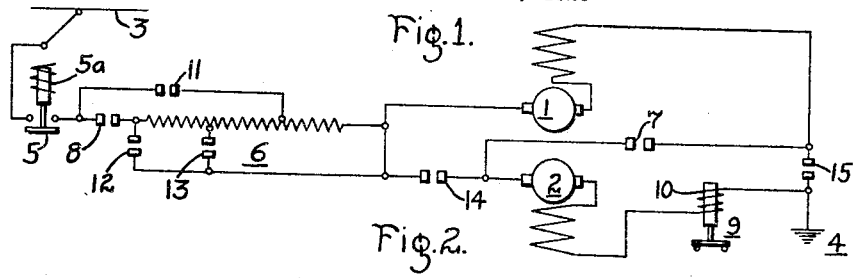
Fig. 1.
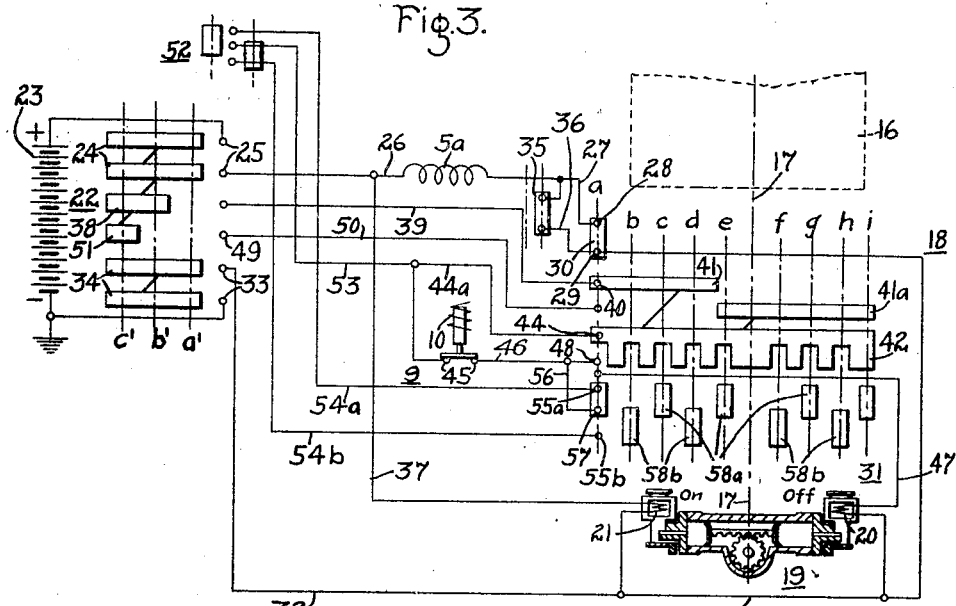
Fig. 2.
Fig. 3.
WITNESSES:
R. J. Butler
W. R. Coley
INVENTOR
Alexander Dalgety Ferguson.
BY
Wesley G. Carr
ATTORNEY Patented Jan. 12, 1926.

1,569,362

UNITED STATES PATENT OFFICE.

ALEXANDER DALGETY FERGUSON, OF OLDHAM, ENGLAND, ASSIGNOR TO WESTINGHOUSE ELECTRIC & MANUFACTURING COMPANY, A CORPORATION OF PENNSYLVANIA.

CONTROL SYSTEM.

Application filed November 12, 1923. Serial No. 674,228.

*To all whom it may concern:*

Be it known that I, ALEXANDER DALGETY FERGUSON, a subject of the King of Great Britain, and a resident of Oldham, in the county of Lancaster, England, have invented a new and useful Improvement in Control Systems, of which the following is a specification.

This invention relates to automatic electric motor control systems of the kind such as are used, for example, in electric traction and like systems. The invention relates more especially to control systems wherein the acceleration of the motor or motors is automatically effected rheostatically with or without series parallel and other control, either by means of a multiple position main accelerating controller which is operated automatically under the control of a control drum driven by the spindle of the main controller, or by means of a plurality of contactors controlled by a controller drum which has mounted on its spindle a sequence switch, in either case, a current-limit switch being used to delay the automatic acceleration of the motor or motors unless or until the current drawn thereby is below a predetermined safe limit.

In the operation of automatic electric motor control systems of the kind above set forth conditions may arise wherein an accelerating current may be drawn which is of such value as to cause the current-limit relay to remain in its upper or open circuit position whereby further control operation of the system, which is dependent upon the dropping of the limit relay, is prevented. Thus, in traction systems such ascending grades or other conditions of track resistance may be encountered by the vehicle or locomotive that it is impossible to start or further to accelerate the traction motors by reason of the fact that the limit switch is held in its open position by the excess current drawn by the motors. Various arrangements have already been proposed for use in automatic motor control systems, whereby, under abnormal conditions mentioned above, the motorman may effect manual control of the motors by means of an auxiliary switch and a notching relay so that the motors may be permitted to take a higher current for effecting starting or acceleration.

The object of the present invention is to provide a simplified arrangement in which the auxiliary notching switch has two operative positions and the necessity for a notching relay is obviated.

According to the invention, the auxiliary notching switch, when operated to the one or the other of its two operative positions, is arranged to short circuit the current-limit relay whereby the control is caused to advance one step non-automatically, after which the acceleration will progress automatically. The closure of the auxiliary notching switch in the one or the other of its positions effects the short-circuiting of the limit switch through alternative conductors which are connected respectively with two contact fingers adapted respectively to be engaged by two sets of contacts on a control drum moving with the controller. The two sets of contacts are arranged to close the said circuit respectively at alternate control positions of the said drum, the width of the said contacts being relatively small so that the circuit is broken immediately the drum commences to move. So-called "carry-over" contacts are provided for completing the movement of the drum to the next control position, said contacts being arranged to bridge contact fingers connected in the circuit which short-circuits the limit switch thereby energizing for example the control magnet of the air engine or other device which effects the movement of the main controller and control drum.

In order that the invention may be fully understood, reference will now be made to the accompanying drawings in which Fig. 1 is a diagrammatic view of a circuit for the main current of two traction motors which are to be controlled in accordance with the invention. Fig. 2 is a view of a sequence chart of well known type for the switches shown in Fig. 1; Fig. 3 is a diagrammatic view of the control circuits for actuating the switches shown in Fig. 1.

Referring to the drawings, Fig. 1 illustrates by way of example two traction motors 1 and 2 and main circuits therefor to which the control system in accordance with the present invention may be applied, the motors 1 and 2 being adapted to be connected either in series or in parallel relation between supply conductors represented by way of example as the trolley 3 and ground 4. The connection of the motors to the supply conductors is effected through a line switch 5 and a main control rheostat 6 is included in series relation with the motors.

The resistance value of the rheostat 6 is varied in steps and various connections of the motors are changed by means of a plurality of switches which in the example now to be described are of the cam operated type, the cams being mounted on a main controller shaft which is rotated pneumatically under the control of a master controller. It will be understood, however, that other types of switches may be provided and other means may be used for operating the same. In the example, the main controller has nine positions or notches designated $a$ to $i$ inclusive, and during the automatic operation of the controller from its first or "off" position $a$ to its last position $i$ rheostatic acceleration of the motors is effected, first with the motors connected in series and next with the motors connected in parallel. Fig. 2 shows the sequence of operation of the switches which effect the control of the motors.

The control operations briefly stated are as follows, reference being made to Figs. 1, 2 and 3. In position $a$ of the main controller, the switches 7 and 8 are closed, and as soon as the master controller is operated the line switch 5 is closed the motors thus being connected in series between the supply conductors 3 and 4 with all the resistance of the rheostat 6 in circuit. The automatic operation of the main controller is initiated and as hereinafter described it is caused to move step-by-step under the control of the limit switch 9 through the actuating coil 10 of which the main motor current flows.

In position $b$ of the main controller the switch 8 is opened and the switch 11 closed, whereby a portion of the resistance is cut out. At position $c$ of the main controller, the switches 11 and 12 are closed whereby still further reducing the resistance. In the next series position $d$, switches 11, 12 and 13 are closed and the resistance is still further reduced while in the last series position $e$ of the main controller, switches 8, 11 and 12 are closed and the resistance is short circuited.

During the next movement of the controller to position $f$, transition from series connection to parallel connection of the motor is effected, first by the closure of switches 15, 11 and 12 and immediately after by the additional closure of the switch 14 and the opening of the switch 7, a part of the resistance being now in circuit. In position $g$ the following switches are closed, viz, 15, 14 and 11 and 13, the resistance being reduced. In position $h$, the switch 8 is additionally closed so that the resistance is still further reduced and finally in position $i$, switches 15, 14, 8 and 12 are closed and the resistance is short circuited.

The cam switches are not shown in detail in Fig. 3 but are collectively indicated by the rectangle 16 at one end of the shaft represented by the dot-and-dash line 17 of the main controller 18. The shaft 17 is rotated by an air engine 19 which comprises for example two oppositely acting pistons working in cylinders having air valves controlled respectively by "off" and "on" magnets 20 and 21, the arrangement being such that when the "off" magnet 20 is energized its cylinder is in communication with the atmosphere and when de-energized is in communication with the compressed air reservoir, (not shown), while when the "on" magnet 21 is energized, its cylinder is in communication with the air reservoir and when de-energized, is in communication with the atmosphere. When both magnets are de-energized the controller is urged to its initial or "off" position; when the "on" magnet 21 is energized the two pistons are in a state of equilibrium and when the off magnet 20 is energized the controller is advanced. The controller is provided with segments effecting the intermittent energization of the off magnet 20 of the air engine to effect step-by-step rotation of the controller under the action of the limit switch 9. A more detailed description of such operation will be given hereinafter.

The master controller indicated at 22 has three operative positions $a'$, $b'$, and $c'$. In the first position $a'$, a circuit is completed from the positive pole of a source of energy such as a battery 23 through the controller segments 24 and the contact fingers 25, conductor 26, the operating coil 5a of the line switch 5, conductor 27, contact fingers 28 and 29 and segments 30 of the drum 31 of the main controller 18, the conductor 32 and through the fingers 33 and segments 34 of the master controller 22 to the negative pole of the battery 23. An interlock 35 is provided on the line switch 5 whereby a holding circuit through conductor 36 is established for the line switch when the controller 31 is moved beyond the first position $a$.

At the same time as the operating coil for the line switch is energized, a circuit is completed from the conductor 26 through the conductor 37 and energizing coil of the "on" magnet 21 of the air engine to the negative conductor 32. Under the conditions now obtaining, the traction motors as above stated are connected in series with one another with all the resistances in circuit. Since the "off" magnet 20 is de-energized, there is air pressure in both the cylinders of the air engine which is therefore in a state of equilibrium.

To advance the control drum 31, it is necessary to energize the coil of the "off" magnet 20 to cause the pistons to move forward and rotate the cam shaft and control drum. To this end, the master controller 22 is moved to position $b'$ wherein a circuit is energized which may be traced from the positive pole of the battery 23, through the master controller segments 24, 38, conductor 39, contact finger 40 and segment 41 of the main controller corresponding to series connection of the motors, the upper part of the comb-like segment 42 of the controller, contact finger 44, conductor 44a, the contacts of the limit switch 9, which is assumed to be closed, conductors 46 and 47 and the energizing coil of the "off" magnet 20 of the air engine, to the negatively energized conductor 32.

The energization of the "off" magnet 20 will cause the air engine to function and the cam shaft and control drum to commence to rotate. On referring to the sequence chart, it will be seen that on step $b$ of the controller, the cam switch 11 closes and the cam switch 8 opens thereby reducing the resistance in the motor circuit, thus causing a sudden rise of motor current such that the limit switch 9 rises to its upper position and interrupts the supply of current to the magnet 20. The movement of the main control drum 31 to its second position is completed by the first tooth of the comb-shaped segment 42 short-circuiting the contacts of the limit switch 9 by means of a contact finger 48 so that the magnet 20 is energized until the second position $b$ of the controller is reached, whereupon the energizing circuit of the magnet 20 is re-transferred to the circuit through the contacts of the limit switch 9 previously described. This circuit however is not established again until the motor current falls to the predetermined value, when the limit switch 9 returns to its closed position. The control drum is then caused to advance another notch in an exactly similar manner. This operation proceeds automatically step-by-step until all resistance is cut out of the circuit of the motors which are still connected in series relation. It will be observed that when the master controller is moved at any time to its off position, it will open the circuit through the coil of the "on" magnet 21 so that the main controller will be returned to its initial position $a$.

By further moving the master controller 22 to its third position $c'$, the contact finger 49 and conductor 50 are energized from the segment 51, thus completing the limit switch circuit, which was originally energized through the conductor 39 and segments 41, but in this instance, through the segment 41a of the drum 31, corresponding to parallel connection of the motors. The operation of the main controller will then proceed as before, transition of the motor connections to parallel operation having been effected and the main controller being automatically actuated through its control positions until the motors are in full parallel, with all the resistances cut out of circuit. It will be understood that by moving the master controller directly into the third notch, complete automatic acceleration can take place up to the full parallel position. If desired, the master controller may have only two positions instead of three and in this case there will be no manual control of the transition from series to parallel.

If now, owing to a severe gradient or other condition of track resistance or other load, the acceleration of the motors is prevented by reason of the limit switch being held up owing to the high strength of the motor current or if the motors have insufficient current to cause them to rotate and start the vehicle or train, acceleration may be obtained manually by operating the auxiliary notching switch which may either be embodied in the master controller or may form a separate unit and be mounted in any convenient position. In the example, the notching switch is provided on the master controller and is indicated at 52.

When non-automatic or hand control is required, the notching switch is operated to one or the other of its closed or "on" positions, whereupon a circuit is established from the positively energized conductor 44a through a conductor 53, through one or the other of the contacts of the hand-notching switch 52 and either of conductors 54a or 54b to the one or the other of contact fingers 55a or 55b respectively, and thence to the conductor 47 through a shunting conductor 56 and a contact finger 57 and one of a plurality of short segments 58a and 58b provided on the main control drum, thus short-circuiting the circuit (previously traced) through the contacts of the limit switch 9, and then through conductor 47 and the energizing coil of the "off" magnet 20 to the negatively energized conductor 32.

The contact segments 58a bridge the fingers 55a and 57 in the first and every odd position of the controller whilst the segments 58b bridge the fingers 55b and 57 in the alternate positions of the controller. The circuit through the contacts of the limit switch 9 can thus be short-circuited and the control advanced one step by moving the notching switch 52 to one or the other of its "on" positions. That is to say, if the main controller is in either of its positions $a$, $c$, $e$, $g$ or $i$, the contact segments 58a are operative and the notching switch must be moved to that of its "on" position wherein the conductor 54a is connected with the conductor 53.

On the other hand if the controller occupies either of its alternate positions $b$, $d$, $f$ or $h$, the segments 58b are operative and the conductor 54b must be connected to conductor 53 by operating the notching switch to its other position. Thus, if the notching switch is moved into one of its operative positions and no result is obtained it can then be moved to the other of its operative positions when an accelerating control step will be obtained. It will be observed further that when an accelerating control step has been effected manually, the control will progress automatically in one of two ways dependent upon the position of the notching switch 52. If the switch 52 occupies its "off" position the closing of the current limit relay 9 will actuate the main drum 18 through its successive notches as explained above. If, however, the notching switch 52 is left in either of its operative positions the closing of the current limit relay will actuate the main drum 18 through two of its operative positions by reason of the shunting circuit established by either of the sets of contact segments 58a or 58b as explained above.

In the arrangement herein described, the circuit through the contacts of the hand-notching switch is completed through the segments 41, 41a and 42 of the main control drum. This ensures that if the master controller is in the second position and the control is advanced manually, the main controller will not move beyond the full series position without the master controller being moved to its third position.

It will be understood that various modifications may be made in the circuit arrangements and the disposition of the relays and switches without departing from the spirit and scope of the invention. I desire therefore that only such limitations shall be imposed as are indicated in the appended claims.

I claim as my invention:

1. The combination with a main controller for starting electric motors, of a current-limit device for causing a step-by-step advance of the man controller, said current-limiting device being actuated upon changes in the current flowing in the motor circuit, and a plural-position switch co-operative to effect a step-by-step operation of the controller as it is moved from position to position independently of said current-limit device.

2. The combination with a main controller for starting electric motors, of a current-limit device for causing a step-by-step advance of the main controller, said current-limit device being actuated upon changes in the motor current, and a plural-position switch co-operative to effect a step-by-step operation of the controller as it is oscillated between two positions, the operation of the controller by said switch being independent of the current-limit device.

3. The combination with a controller for starting elecric motors, and a current limit device for automatically causing a step-by-step advance of the controller, of means comprising a switch having a plurality of operative positions, for respectively causing said controller to advance through alternate steps independently of the current limit device.

4. The combination with a main controller for starting electric motors and a current limit device for causing a step-by-step advance of said main controller in accordance with the motor current, said main controller having a plurality of individual contact segments, of means comprising an auxiliary controller, having a plurality of operative positions, and adapted to successively energize said individual contact segments to cause a step-by-step advance of the main controller independently of the current limit device.

5. The combination with a controller for starting electric motors, of a current limit device for causing a step-by-step advance of the controller in accordance with the motor current, and manually actuated means, having a plurality of operative positions, for causing the controller to begin a step independently of the current limit device and after the step has been completed preventing the taking of further steps independently of said current limit device until said manually actuated means is actuated to another of said operative positions.

6. The combination with a main controller for starting electric motors, of a current limit device for causing a step-by-step advance of the controller in accordance with the motor current, and means, comprising an auxiliary controller having a plurality of operative positions, for causing the main controller to begin a step independently of the current limit device and after the step has been completed preventing the taking of further steps independently of said current limit device until said auxiliary controller is actuated to another of said operative positions.

7. The combination with a controller for starting electric motors, of a current limit device for causing a step-by-step advance of the controller in accordance with the motor current, and means, comprising a single member having a plurality of operative positions, for causing the controller to begin a step independently of the current limit device and after the step has been completed preventing the taking of further steps independently of said current limit device until said member is actuated to another of said operative positions.

In testimony whereof, I have hereunto subscribed my name this seventeenth day of October, 1923.

ALEXANDER DALGETY FERGUSON.